United States Patent [19]

Van Rens

[11] 3,908,607
[45] Sept. 30, 1975

[54] APPARATUS FOR ELIMINATING DRAINS IN A ROTARY COMBUSTION ENGINE

[75] Inventor: Russell J. Van Rens, Kenosha, Wis.

[73] Assignee: Outboard Marine Corporation, Waukegan, Ill.

[22] Filed: Feb. 20, 1974

[21] Appl. No.: 444,053

[52] U.S. Cl. ................ 123/8.01; 123/8.13; 418/97
[51] Int. Cl.² ........................................ F02B 53/00
[58] Field of Search........ 123/8.01, 196 W, 196 CP, 123/8.13; 418/98, 97, 99, 83, 87, 15; 184/15 R

[56] References Cited
UNITED STATES PATENTS

| | | | |
|---|---|---|---|
| 2,459,594 | 1/1949 | Smith | 123/196 W |
| 2,852,046 | 9/1958 | Kiekhaefer | 123/196 CP |
| 3,180,323 | 4/1965 | Paschke | 123/8.01 |
| 3,424,135 | 1/1969 | Tado | 418/100 |
| 3,811,806 | 5/1974 | King | 123/8.01 |

*Primary Examiner*—C. J. Husar
*Assistant Examiner*—O. T. Sessions
*Attorney, Agent, or Firm*—Michael, Best & Friedrich

[57] ABSTRACT

Disclosed herein is a rotary internal combustion engine comprising a housing assembly defining a rotor cavity including a peripheral wall, a fuel inlet communicating with the rotor cavity, means defining a "drains" collecting area, a rotor located for rotation in said cavity and including a plurality of apex portions in engagement with the peripheral wall so as to create in the cavity and in response to rotor rotation a substantially sealed, rotating chamber which, during one portion of the rotor rotational cycle, expands in volume and accordingly decreases in pressure and which, after an initial interval of expansion, communicates with the fuel inlet to permit inflow of fuel into the rotating chamber for subsequent compression and ignition, and means operable in response to the initial interval of expansion of volume in the rotating chamber during the first portion of the rotor rotational cycle and prior to communication with the fuel inlet for pumping drains from the drains collecting area to the rotating chamber.

7 Claims, 3 Drawing Figures

APPARATUS FOR ELIMINATING DRAINS IN A ROTARY COMBUSTION ENGINE

BACKGROUND OF THE INVENTION

The invention relates generally to rotary internal combustion engines including a housing assembly defining a rotor cavity including a peripheral wall and means for supplying fuel to the cavity, together with a rotor located for rotation in the cavity and including a plurality of apex portions in engagement with the peripheral wall so as to create in the cavity and in response to rotor rotation a substantially sealed, moving or rotating chamber which varies in volume in response to rotor rotation.

Attention is directed to the Heidner U.S. Pat. No. 3,132,635 issued May 12, 1964, to the Brown U.S. Pat. No. 3,709,202 issued Jan. 9, 1973, and to the Pipes U.S. Pat. No. 3,765,393 issued Oct. 16, 1973.

SUMMARY OF THE INVENTION

The invention provides means operable in response to expansion of the moving chamber in a rotary internal combustion engine for pumping drains from a drains collecting area to the moving chamber for combustion so as to eliminate possible spillage of drains into the environment. In the preferred construction, the fuel supply means for the rotary internal combustion engine includes a fuel inlet which communicates with the rotor cavity and which is located relative to the rotor rotational cycle so that the moving chamber generated by cooperation of the rotor with the cavity provides a period of initial expansion prior to communication of the rotating chamber with the fuel inlet. Such period of initial expansion is employed to pump drains from the drains collecting area through a duct which communicates with the cavity in position for communication with the moving chamber during the initial period of expansion and prior to communication with the fuel inlet. Thus, the low pressure condition generated by the initial period of expansion sucks or draws drains from the collecting area into the moving chamber for ultimate combustion.

In accordance with a preferred embodiment of the invention, the fuel inlet is located in an end wall or plate which forms a part of the housing assembly and which also assists in defining the rotor cavity. In addition, in one embodiment, the duct communicates with the cavity through the peripheral wall thereof and at a point in spaced relation from the fuel inlet in the end wall or plate. In another embodiment, the duct communicates with the rotor cavity through an end wall or plate.

In further accordance with the invention, one-way valve means are provided in the fuel duct for permitting flow from the drains collecting area to the cavity and for preventing flow from the cavity to the drains collecting area.

In the preferred construction in accordance with the invention, the engine crankshaft is arranged vertically and the drains collecting area is constituted by a pocket or recess in which the lower crankshaft bearing is received.

One of the principal features of the invention is the provision of means in a rotary internal combustion engine facilitating combustion of drains which would otherwise collect in the engine and which might otherwise be exhausted to the environment.

Another of the principal features of the invention is the provision of a rotary internal combustion engine including means for pumping drains from a collecting area to the rotor cavity for combustion therein in response to the pressure variation occurring in response to rotor rotation.

Still another of the principal features of the invention is the provision in a rotary internal combustion engine of a drains elimination arrangement which is adapted to effect combustion of the drains and which is economical to construct and reliable in operation.

Other objects and advantages of the invention will become known by reference to the following drawings, general description, and claims.

DRAWINGS

Figure 1:
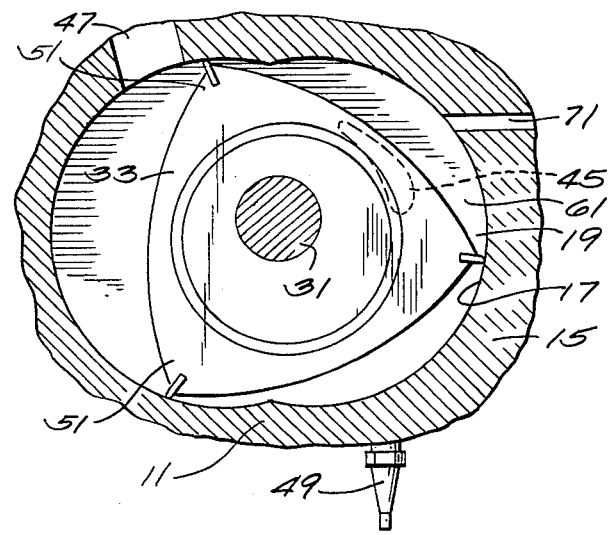
FIG. 1 is a fragmentary and partially schematic view of a rotary combustion engine embodying various of the features of the invention.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown schematically in the drawings is a rotary internal combustion engine 11 which includes a housing assembly or block 13 including a housing member 15 having an internal peripheral wall 17 partially defining a substantially closed rotary cavity 19, and a pair of opposed end walls or cover plates 21 and 23 which are suitably connected to the housing member 15 to further define the rotor cavity 19. Providing in the housing assembly 13 are spaced crankshaft bearings 27 and 29 which rotatably support a crankshaft 31 which, in turn, supports a rotor 33 for rotation relative to the crankshaft 31 and for rotation relative to and within the cavity 19 about an axis located in eccentric relation to the crankshaft axis. Suitable seals 37 and 39 are provided around the crankshaft 31 axially outwardly of the spaced bearings 27 and 29.

The housing assembly 13 also includes a fuel inlet 45 which communicates with the cavity 19 and is adapted to supply to the cavity 19 a mixture of fuel and air and which can also include a lubricant. While other constructions can be employed, in the construction illustrated in FIGS. 1 and 2 the fuel inlet 45 is located in the end wall 21 in spaced relation to the peripheral wall 17 of the housing member 15. Also communicating with the cavity 19 is an exhaust port 47. Mounted on the housing member 15 in communication with the cavity 19 is a spark plug 49.

Also included in the housing assembly 13 is means defining an area in which drains collect. Any suitable drains collecting area can be employed. In the illustrated construction, the crankshaft 31 is vertically arranged and the lower bearing 29 is housed in a pocket 55 which comprises a drains collecting area. Any suitable arrangement can be provided for flow of drains to the drains collecting area.

The rotor 33 includes a plurality of apex portions 51 which sealingly engage the peripheral wall 17 defining the cavity 19 so as to produce, during rotation of the rotor 33 within the cavity 19, a substantially sealed rotating chamber 61 which varies in volume and pressure as the rotor 33 rotates.

As thus far described, the structure is conventional and is believed to be well known to those having ordinary skill in the design of rotary combustion engines. However, the invention is not limited to the foregoing specifically described construction.

In accordance with the invention, during one portion of the rotor rotational cycle, the chamber 61 expands in volume and, after an initial interval of expansion during this portion, the chamber 61 communicates with the fuel inlet 45 to permit inflow of fuel into the moving chamber 61 for subsequent compression and ignition.

In further accordance with the invention, means are provided for operation in response to the initial interval of expansion of volume in the rotating chamber 61 during the first portion of the rotor rotational cycle and prior to communication of the moving chamber 61 with the fuel inlet 45 for pumping drains from the drains collecting area to the moving chamber. While various arrangements can be employed, in the illustrated construction, such means comprises a duct 71 located in the housing assembly 13 and communicating with the drains collecting area and with the rotor cavity 19 so as to provide communication with the moving chamber 61 during the first portion of the rotor rotational cycle and prior to communication of the moving chamber 61 with the fuel inlet 45, together with a one-way valve 75 in the duct 71 for permitting flow from the cavity to the drains collecting area. Any suitable one-way valve can be employed. In the illustrated construction, a ball check valve is shown.

Figure 2:
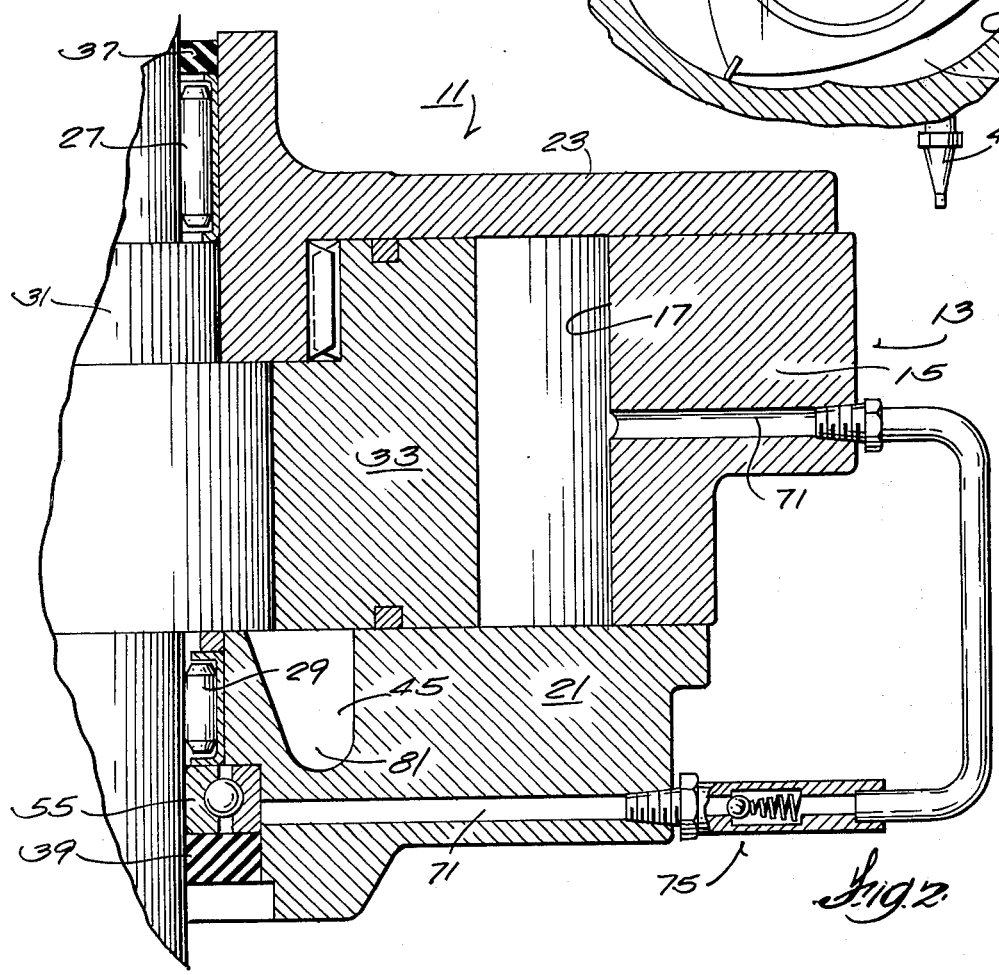
FIG. 2 is an enlarged, fragmentary, and partially schematic cross sectional view of the engine shown in FIG. 1.

While other specific constructions are possible, in the construction illustrated in FIG. 2 the duct 71 communicates with the cavity 19 through the peripheral wall 17 in the area adjacent to or in the vicinity of the fuel inlet in the end wall 21. In addition, in the specifically disclosed construction, the duct 71 communicates with the pocket 55 which houses the lower bearing 29 and into which drains collect or accumulate. If desired, the duct 71 could communicate with a portion of the fuel supply system, such as the bottom 81 of the fuel inlet 45 in which drains can accumulate. If relatively large amounts of such drains accumulate to form "puddles", such puddles can cause uneven combustion and poor running characteristics.

In operation, the partial vacuum or low pressure condition which occurs incident to initial expansion of the moving chamber 61 causes drains to be drawn through the check valve 75 from the drains accumulation or collecting area and to be delivered into the expanding chamber 61 for ultimate combustion in response to spark plug ignition.

Figure 3:
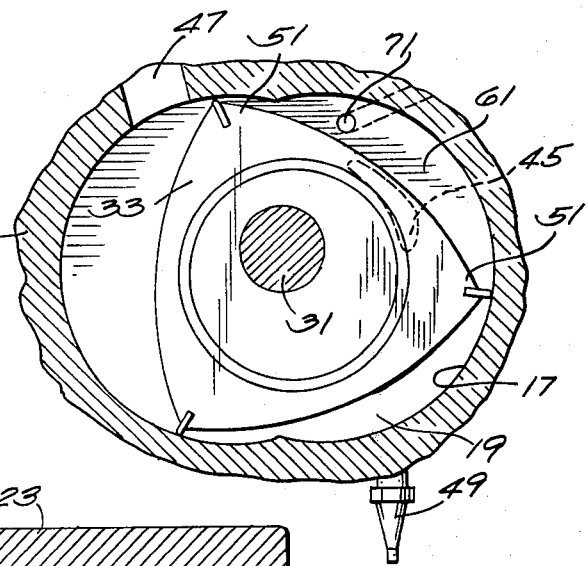
FIG. 3 is a fragmentary and partially schematic view of another embodiment of a rotary internal combustion engine embodying various of the features of the invention.

Shown in FIG. 3 is another embodiment of the invention in which the duct 71 communicates with the rotor cavity 19 through one of the end walls 21 and 23 and in such position so as to cause initiation and completion of communication with the expanding chamber prior to communication of the chamber with the fuel inlet. Under such circumstances, a check valve is not required as the duct 71 is subject only to suction pressure occurring during expansion of the chamber and prior to communication of the chamber with the fuel inlet 45.

Various of the features of the invention are set forth in the following claims.

I claim:

1. A rotary internal combustion engine comprising a housing assembly defining a rotor cavity including a peripheral wall, a fuel inlet communicating with said cavity, means defining a drains collecting area, a rotor located for rotation in said cavity and including a plurality of apex portions in engagement with said peripheral wall so as to create in said cavity and in response to rotor rotation a substantially sealed moving chamber which, during one portion of the rotor rotational cycle, expands in volume and which, after an initial interval of expansion, communicates with said fuel inlet to permit inflow of fuel into said moving chamber for subsequent compression and ignition, and means operable in response to the initial interval of expansion of volume in said chamber during said first portion of the rotor rotational cycle and prior to communication with said fuel inlet for pumping drains from said drains collecting area to said moving chamber.

2. A rotary internal combustion engine in accordance with claim 1 wherein said drains pumping means comprises a duct located in said housing assembly and communicating with said cavity so as to provide communication with said moving chamber during said one portion of the rotor rotational cycle and prior to communication of said moving chamber with said fuel inlet, said duct also communicating with said drains collecting area, and one-way valve means in said duct for permitting flow from said drains collecting area to said cavity and for preventing flow from said cavity to said drains collecting area.

3. A rotary internal combustion engine in accordance with claim 2 wherein said rotor is supported by bearing means and said drains collecting area houses said bearing means.

4. A rotary internal combustion engine in accordance with claim 2 wherein said housing assembly includes a housing member including said peripheral wall and a side plate closing one end of said cavity, and wherein said fuel inlet is located in said side plate in inwardly spaced relation from said peripheral wall, and wherein said duct communicates with said cavity through said peripheral wall in the vicinity of said fuel inlet.

5. A rotary internal combustion engine in accordance with claim 1 wherein said drains pumping means comprises a duct located in said housing assembly and communicating with said cavity so as to provide communication with said moving chamber during said one portion of the rotor rotational cycle and prior to communication of said moving chamber with said fuel inlet, said duct also communicating with said drains collecting area.

6. A rotary internal combustion engine in accordance with claim 5 wherein said housing assembly includes a housing member including said peripheral wall and a side plate closing one end of said cavity, and wherein said duct communicates with said cavity through one of said plate and said peripheral wall.

7. A rotary internal combustion engine comprising a housing assembly including a housing member having an internal peripheral wall defining a rotor cavity, and a side plate closing one end of said cavity, a fuel inlet communicating with said cavity and located in said side plate in inwardly spaced relation from said peripheral wall, a rotor including a plurality of apex portions, upper and lower vertically spaced bearing means located on said housing assembly and supporting said rotor for rotation in said cavity with said apex portions in engagement with said peripheral wall so as to create in said cavity and in response to rotor rotation a substantially sealed moving chamber which, during one portion of the rotor rotational cycle expands in volume and decreases in pressure and which, after an initial interval of expansion, communicates with said fuel inlet to permit inflow of fuel into said moving chamber for subsequent compression and ignition, a duct located in said housing assembly, communicating with said lower bearing means and communicating with said cavity through said peripheral wall and in the vicinity of said fuel inlet so as to provide communication with said moving chamber during said one portion of the rotor rotational cycle and prior to communication of said moving chamber with said fuel inlet, and one-way valve means in said duct for permitting flow of drains from said lower bearing means to said cavity and for preventing drains flow from said cavity to said lower bearing means whereby drains are pumped from said lower bearing means to said moving chamber.

* * * * *